US010931606B2

United States Patent
Kim (10) Patent No.: US 10,931,606 B2
(45) Date of Patent: Feb. 23, 2021

(54) MOBILE TERMINAL AND METHOD OF CONTROLLING THEREFOR

(71) Applicant: LG ELECTRONICS INC., Seoul (KR)

(72) Inventor: Heejeong Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/192,641

(22) Filed: Nov. 15, 2018

(65) Prior Publication Data

US 2019/0089658 A1 Mar. 21, 2019

Related U.S. Application Data

(63) Continuation of application No. 14/504,066, filed on Oct. 1, 2014, now Pat. No. 10,158,586.

(30) Foreign Application Priority Data

Oct. 1, 2013 (KR) ........................ 10-2013-0117439

(51) Int. Cl.
*H04L 12/58* (2006.01)
*G06F 3/0486* (2013.01)
(Continued)

(52) U.S. Cl.
CPC ............ *H04L 51/04* (2013.01); *G06F 3/0486* (2013.01); *G06F 3/0488* (2013.01);
(Continued)

(58) Field of Classification Search
CPC ..... H04L 51/04; H04L 12/1827; H04L 51/32; H04L 51/16; H04L 12/1813;
(Continued)

(56) References Cited

U.S. PATENT DOCUMENTS 6,212,548 B1 4/2001 DeSimone et al.
6,539,421 B1 3/2003 Appelman et al.
(Continued)

FOREIGN PATENT DOCUMENTS

KR 1020110008713 1/2011

OTHER PUBLICATIONS

Author: G Suite Title: Gmail New Compose [ online ] Date: Oct. 30, 2012 [ Retrieved May 2020 from https://www.youtube.com/watch?v=WVQegYIA3DE ] pp. 1-5 (Year: 2012).*

(Continued)

*Primary Examiner* — Ajay M Bhatia
*Assistant Examiner* — Phoebe X Pan
(74) *Attorney, Agent, or Firm* — Lee, Hong, Degerman, Kang & Waimey PC (57) ABSTRACT

A mobile terminal and controlling method thereof are disclosed, by which a message inputted before or after a message reception can be selectively sent when a message is received from a counterpart while composing a message. The present invention includes the steps of if a counterpart message is externally received in the course of a message input to a message input window and a message is additionally inputted to the message input window, applying a visual effect to either a message inputted before receiving the counterpart message or the additionally inputted message and if a send command is received, sending a message corresponding to the send command to a counterpart, wherein the message corresponding to the send command is selected from a message having the visual effect applied thereto and a message not having the visual effect applied thereto among messages displayed on the message input window.

18 Claims, 9 Drawing Sheets

(51) Int. Cl.
*H04L 12/18* (2006.01)
*G06F 3/0488* (2013.01)
*G06Q 10/10* (2012.01)
*G06Q 50/00* (2012.01)

(52) U.S. Cl.
CPC ....... *G06Q 10/107* (2013.01); *H04L 12/1827* (2013.01); *H04L 51/32* (2013.01); *G06Q 50/01* (2013.01)

(58) Field of Classification Search
CPC ... G06F 3/0486; G06F 3/0488; G06Q 10/107; G06Q 50/01; H04M 1/72552
See application file for complete search history.

(56) References Cited

U.S. PATENT DOCUMENTS

| | | | |
|---|---|---|---|
| 6,907,447 | B1 | 6/2005 | Cooperman et al. |
| 7,343,561 | B1 | 3/2008 | Stochosky et al. |
| 7,779,076 | B2 | 8/2010 | Heikes et al. |
| 7,904,500 | B1 | 3/2011 | Anderson |
| 8,001,184 | B2 | 8/2011 | Etgen et al. |
| 8,166,408 | B2 | 4/2012 | Castellucci |
| 8,346,864 | B1* | 1/2013 | Amidon ............... H04L 65/1069 709/204 |
| 8,984,080 | B1 | 3/2015 | Curtis et al. |
| 9,509,645 | B2 | 11/2016 | Lim |
| 9,906,471 | B1* | 2/2018 | Rensburg ............... G06F 40/166 |
| 9,996,248 | B2* | 6/2018 | Park ....................... G06F 3/0487 |
| 10,225,215 | B2* | 3/2019 | Zha ....................... G06Q 10/107 |
| 2002/0130904 | A1 | 9/2002 | Becker et al. |
| 2003/0030670 | A1 | 2/2003 | Duarte et al. |
| 2003/0163525 | A1 | 8/2003 | Hendriks et al. |
| 2004/0015548 | A1* | 1/2004 | Lee ....................... H04L 65/4061 709/204 |
| 2004/0015553 | A1 | 1/2004 | Griffin et al. |
| 2004/0015610 | A1 | 1/2004 | Treadwell |
| 2004/0019637 | A1 | 1/2004 | Goodman et al. |
| 2004/0162878 | A1 | 8/2004 | Lewis et al. |
| 2005/0055405 | A1 | 3/2005 | Kaminsky et al. |
| 2005/0055412 | A1 | 3/2005 | Kaminsky et al. |
| 2005/0149621 | A1* | 7/2005 | Kirkland ................. H04L 51/04 709/207 |
| 2005/0210394 | A1 | 9/2005 | Crandall et al. |
| 2005/0223057 | A1 | 10/2005 | Buchheit et al. |
| 2006/0167993 | A1 | 7/2006 | Aaron et al. |
| 2006/0174207 | A1 | 8/2006 | Deshpande |
| 2006/0210034 | A1* | 9/2006 | Beadle ................... G06Q 10/107 379/88.22 |
| 2006/0248150 | A1 | 11/2006 | Chaar et al. |
| 2007/0174407 | A1 | 7/2007 | Chen et al. |
| 2007/0180028 | A1 | 8/2007 | Chen et al. |
| 2007/0198645 | A1 | 8/2007 | Chen et al. |
| 2007/0198646 | A1 | 8/2007 | Chen et al. |
| 2007/0233801 | A1 | 10/2007 | Eren et al. |
| 2007/0288560 | A1 | 12/2007 | Bou-Ghannam et al. |
| 2008/0144784 | A1 | 6/2008 | Limberg |
| 2008/0208984 | A1* | 8/2008 | Rosenberg ............... H04L 51/04 709/206 |
| 2008/0228894 | A1 | 9/2008 | Chen et al. |
| 2009/0177981 | A1* | 7/2009 | Christie ............... H04M 1/72552 715/758 |
| 2009/0216836 | A1* | 8/2009 | Haynes ................. G06Q 10/107 709/204 |
| 2011/0191429 | A1* | 8/2011 | Tu .......................... G06F 15/16 709/206 |
| 2011/0258559 | A1 | 10/2011 | You et al. |
| 2012/0124147 | A1 | 5/2012 | Hamlin et al. |
| 2013/0047099 | A1 | 2/2013 | Markman et al. |
| 2013/0060875 | A1 | 3/2013 | Burnett et al. |
| 2013/0069969 | A1 | 3/2013 | Chang et al. |
| 2013/0086175 | A1* | 4/2013 | Claux ..................... G06F 3/0482 709/206 |
| 2013/0097526 | A1* | 4/2013 | Stovicek ................. H04L 51/22 715/752 |
| 2013/0179800 | A1 | 7/2013 | Jeong et al. |
| 2013/0187861 | A1* | 7/2013 | Lavallee ................. G06F 9/543 345/173 |
| 2013/0318176 | A1* | 11/2013 | Claux ................... G06Q 10/107 709/206 |
| 2014/0047027 | A1* | 2/2014 | Moyers ................... H04L 51/04 709/204 |
| 2014/0059448 | A1 | 2/2014 | Lee |
| 2014/0068468 | A1* | 3/2014 | Yoon ..................... H04L 65/403 715/758 |
| 2014/0082520 | A1* | 3/2014 | Mamoun ............ H04M 1/72544 715/752 |
| 2014/0101572 | A1 | 4/2014 | Gunderson et al. |
| 2014/0172426 | A1* | 6/2014 | Aratsu ................. G10L 21/0208 704/235 |
| 2014/0184544 | A1 | 7/2014 | Lim |
| 2014/0195933 | A1* | 7/2014 | Rao DV ................. H04L 51/046 715/758 |
| 2014/0213318 | A1 | 7/2014 | Leem et al. |
| 2014/0317561 | A1* | 10/2014 | Robinson ............. G06F 3/04883 715/800 |
| 2014/0344678 | A1* | 11/2014 | Chae ..................... G06F 40/166 715/256 |
| 2015/0026599 | A1* | 1/2015 | Kim ..................... H04L 12/1827 715/753 |
| 2015/0058720 | A1* | 2/2015 | Smadja ................... H04W 4/14 715/271 |
| 2015/0074555 | A1 | 3/2015 | Yoon et al. |
| 2015/0095801 | A1 | 4/2015 | Kim |
| 2015/0169975 | A1* | 6/2015 | Kienzle ............... G06F 3/04883 382/189 |
| 2015/0256675 | A1 | 9/2015 | Sri et al. |
| 2015/0281145 | A1 | 10/2015 | Ji |
| 2015/0286365 | A1 | 10/2015 | Mizukami et al. |
| 2015/0312175 | A1 | 10/2015 | Langholz |
| 2015/0334075 | A1 | 11/2015 | Wang et al. |
| 2016/0149838 | A1* | 5/2016 | Jeong ................. H04M 1/72552 715/753 |
| 2016/0179773 | A1 | 6/2016 | Shen et al. |
| 2016/0202889 | A1 | 7/2016 | Shin et al. |
| 2016/0205049 | A1 | 7/2016 | Kim et al. |
| 2016/0313877 | A1 | 10/2016 | Ha et al. |
| 2017/0109338 | A1* | 4/2017 | Page ..................... G06F 40/169 |
| 2017/0111305 | A1* | 4/2017 | Bastide ................... H04L 51/16 |
| 2017/0139557 | A1* | 5/2017 | Heo ..................... G06F 3/04817 |
| 2019/0124021 | A1* | 4/2019 | DeMattei ............... G06F 3/0488 |
| 2020/0092410 | A1* | 3/2020 | Lim ..................... H04M 1/72527 |

OTHER PUBLICATIONS

U.S. Appl. No. 14/504,066, Notice of Allowance dated Aug. 8, 2018, 19 pages.

U.S. Appl. No. 14/504,066, Office Action dated Mar. 9, 2018, 14 pages.

U.S. Appl. No. 14/504,066, Office Action dated Dec. 29, 2016, 23 pages.

Korean Intellectual Property Office Application No. 10-2013-0117439, Office Action dated Dec. 30, 2019, 5 pages.

* cited by examiner

MOBILE TERMINAL AND METHOD OF CONTROLLING THEREFOR

CROSS-REFERENCE TO RELATED APPLICATIONS

This application is a continuation of U.S. patent application Ser. No. 14/504,066, filed on Oct. 1, 2014, now U.S. Pat. No. 10,158,586, which claims the benefit of earlier filing date and right of priority to Korean Application No. 10-2013-0117439, filed on Oct. 1, 2013, the contents of which are all hereby incorporated by reference herein in their entirety.

BACKGROUND OF THE INVENTION

Field of the Invention

The present invention relates to a mobile terminal, and more particularly, to a mobile terminal and controlling method thereof. Although the present invention is suitable for a wide scope of applications, it is particularly suitable for selectively sending a message inputted before or after a message reception in case of receiving a message from a counterpart in the course of composing a message.

Discussion of the Related Art

Generally, terminals can be classified into mobile/portable terminals and stationary terminals. The mobile terminals can be further classified into handheld terminals and vehicle mount terminals according to possibility of user's direct portability.

As functions of the terminal are getting diversified, the terminal tends to be implemented as a multimedia player provided with composite functions such as photographing of photos or videos, playback of music or video files, game play, broadcast reception and the like for example.

To support and increase the terminal functions, it is able to consider the improvement of structural parts and/or software parts of the terminal.

Using the above-mentioned mobile terminal, messages can be transceived with a counterpart located in a remote place. While one message is composed, if another message is received from a counterpart, the former message composed before the reception of the latter message can be completed and then sent irrespective of the received message. However, it may be necessary to modify the composed message or to compose a new message, depending on a content of the received message. In this case, a related art method causes the following inconvenience. First of all, at least one portion of a previously inputted message is deleted or copied to a clipboard. Secondly, a desired message should be composed again.

SUMMARY OF THE INVENTION

Accordingly, the present invention is directed to a mobile terminal and controlling method thereof that substantially obviate one or more problems due to limitations and disadvantages of the related art.

An object of the present invention is to provide a mobile terminal and controlling method thereof, by which a message composed before or after a reception of another message from a counterpart can be sent selectively and conveniently.

Technical tasks obtainable from the present invention are non-limited by the above-mentioned technical tasks. And, other unmentioned technical tasks can be clearly understood from the following description by those having ordinary skill in the technical field to which the present invention pertains.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile terminal according to one embodiment of the present invention includes a wireless communication unit, a touchscreen configured to display a message input window, and a controller, if a counterpart message is externally received through the wireless communication unit in the course of a message input to the message input window and a message is additionally inputted to the message input window, applying a visual effect to either a message inputted before receiving the counterpart message or the additionally inputted message, the controller, if a send command is received through the touchscreen, sending a message corresponding to the send command to a counterpart, wherein the message corresponding to the send command is selected from a message having the visual effect applied thereto and a message not having the visual effect applied thereto among messages displayed on the message input window.

In another aspect of the present invention, a method of controlling a mobile terminal according to another embodiment of the present invention includes the steps of if a counterpart message is externally received in the course of a message input to a message input window and a message is additionally inputted to the message input window, applying a visual effect to either a message inputted before receiving the counterpart message or the additionally inputted message and if a send command is received, sending a message corresponding to the send command to a counterpart, wherein the message corresponding to the send command is selected from a message having the visual effect applied thereto and a message not having the visual effect applied thereto among messages displayed on the message input window.

In further aspect of the present invention, a mobile terminal according to another embodiment of the present invention includes a wireless communication unit, a touchscreen configured to display a $1^{st}$ message input window, and a controller, if a counterpart message is externally received in the course of a message input to the $1^{st}$ message input window through the wireless communication unit and a message is additionally inputted to the $1^{st}$ message input window, displaying a message inputted before receiving the counterpart message on a $2^{nd}$ message input window, the controller, if a send command is received, controlling a message corresponding to the send command to be sent to a counterpart, wherein the message corresponding to the send command is selected from the message displayed on the $1^{st}$ message input window and the message displayed on the $2^{nd}$ message input window.

In another further aspect of the present invention, a method of controlling a mobile terminal according to another further embodiment of the present invention includes the steps of if a counterpart message is externally received in the course of a message input to a $1^{st}$ message input window and a message is additionally inputted to the $1^{st}$ message input window, displaying a message inputted before receiving the counterpart message on a $2^{nd}$ message input window and if a send command is received, sending a message corresponding to the send command to a counterpart, wherein the message corresponding to the send command is selected from the message displayed on the $1^{st}$ message input window and the message displayed on the $2^{nd}$ message input window.

Accordingly, the present invention provides the following effects and/or features.

First of all, a message composed before a reception of a prescribed message from a counterpart and a message composed after the reception of the prescribed message from the counterpart can be displayed in a manner of being identifiable from each other through a prescribed visual effect.

Secondly, since at least one of a message composed before a reception of a prescribed message from a counterpart and a message composed after the reception of the prescribed message from the counterpart can be selectively sent to the counterpart, it is unnecessary to delete a previously composed message separately. And, it is unnecessary to save the previously composed message in a clipboard separately.

Effects obtainable from the present invention may be non-limited by the above mentioned effect. And, other unmentioned effects can be clearly understood from the following description by those having ordinary skill in the technical field to which the present invention pertains.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

As used herein, the suffixes 'module', 'unit' and 'part' are used to denote elements in order to facilitate the disclosure only. Therefore, significant meanings or roles are not given to the suffixes themselves, and it is understood that the suffixes 'module', 'unit' and 'part' can be used together or interchangeably.

Features of embodiments of the present invention are applicable to various types of terminals. Examples of such terminals include mobile terminals, such as mobile phones, user equipment, smart phones, mobile computers, digital broadcast terminals, personal digital assistants, portable multimedia players (PMP) and navigators. However, by way of non-limiting example only, further description will be with regard to a mobile terminal 100, and it should be noted that such teachings may apply equally to other types of terminals such as digital TV, desktop computers and so on.

Figure 1:
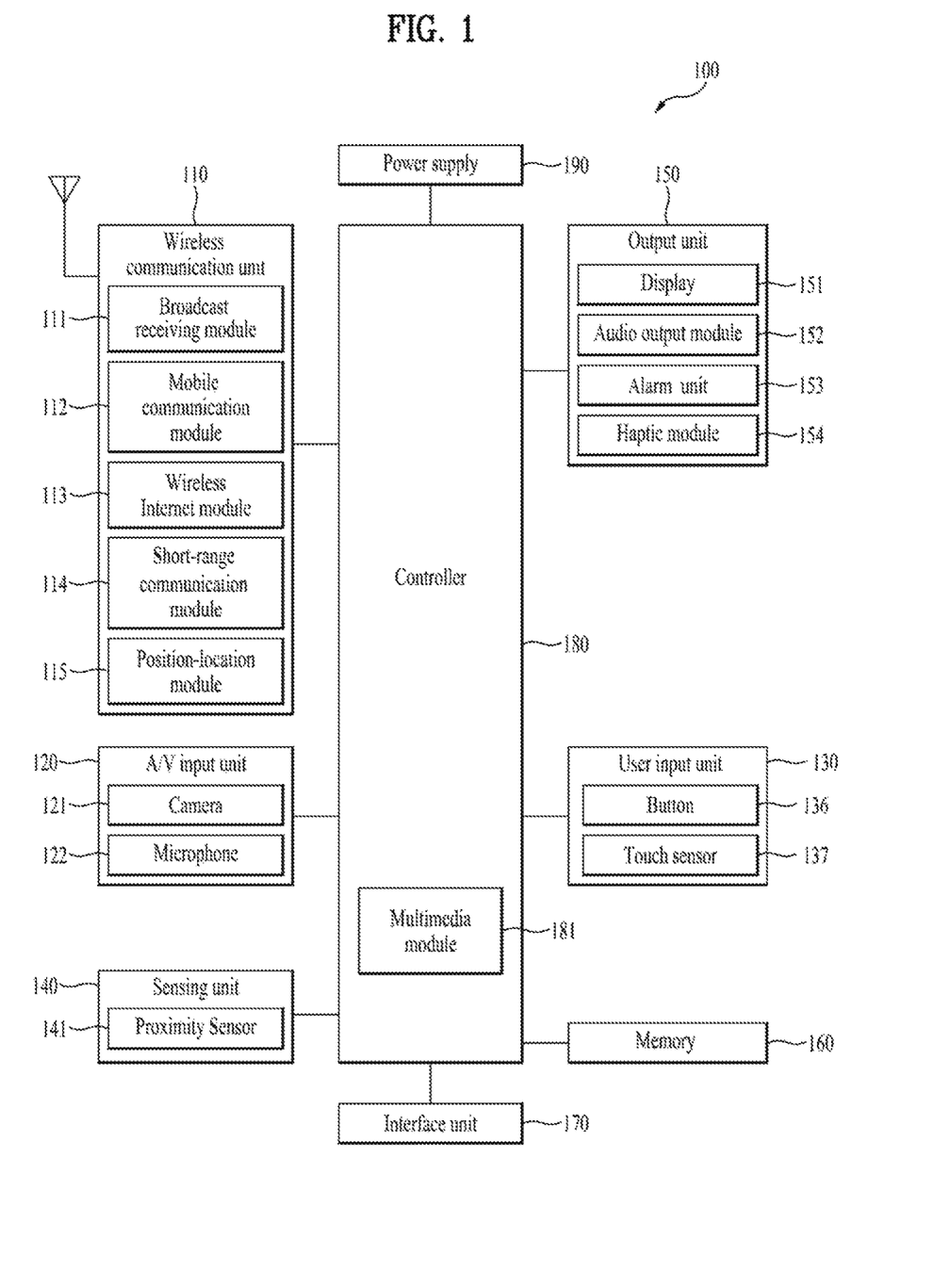
FIG. 1 is a block diagram of a mobile terminal according to one embodiment of the present invention.

FIG. 1 is a block diagram of a mobile terminal 100 in accordance with an embodiment of the present invention. With reference to FIG. 1, the mobile terminal 100 includes a wireless communication unit 110, an A/V (audio/video) input unit 120, a user input unit 130, a sensing unit 140, an output unit 150, a memory 160, an interface unit 170, a controller 180, and a power supply unit 190. FIG. 1 shows the mobile terminal 100 having various components, but implementing all of the illustrated components is not a requirement. More or fewer components may be implemented according to various embodiments.

The wireless communication unit 110 typically includes one or more components which permit wireless communication between the mobile terminal 100 and a wireless communication system or network within which the mobile terminal 100 is located. For instance, the wireless communication unit 110 can include a broadcast receiving module 111, a mobile communication module 112, a wireless Internet module 113, a short-range communication module 114, and a position-location module 115.

The broadcast receiving module 111 receives a broadcast signal and/or broadcast associated information from an external broadcast managing server via a broadcast channel. The broadcast channel may include a satellite channel and a terrestrial channel. At least two broadcast receiving modules 111 can be provided in the mobile terminal 100 to facilitate simultaneous reception of at least two broadcast channels or broadcast channel switching.

The broadcast managing server is generally a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and/or a data broadcast signal, among other signals. If desired, the broadcast signal may further include a broadcast signal combined with a TV or radio broadcast signal.

The broadcast associated information includes information associated with a broadcast channel, a broadcast program, or a broadcast service provider. Furthermore, the broadcast associated information can be provided via a mobile communication network. In this instance, the broadcast associated information can be received by the mobile communication module 112.

The broadcast associated information can be implemented in various forms. For instance, broadcast associated information may include an electronic program guide (EPG) of digital multimedia broadcasting (DMB) and an electronic service guide (ESG) of digital video broadcast-handheld (DVB-H).

The broadcast receiving module 111 may be configured to receive broadcast signals transmitted from various types of broadcast systems. By nonlimiting example, such broadcasting systems may include digital multimedia broadcasting-terrestrial (DMB-T), digital multimedia broadcasting-satellite (DMB-S), digital video broadcast-handheld (DVB-H), digital video broadcast-convergence of broadcasting and mobile services (DVB-CBMS), Open Mobile Alliance Broadcast (OMA-BCAST), the data broadcasting system known as media forward link only (MediaFLO™) and integrated services digital broadcast-terrestrial (ISDB-T). Optionally, the broadcast receiving module 111 can be configured to be suitable for other broadcasting systems as well as the above-noted digital broadcasting systems.

The broadcast signal and/or broadcast associated information received by the broadcast receiving module 111 may be stored in a suitable device, such as the memory 160.

The mobile communication module 112 transmits/receives wireless signals to/from one or more network entities (e.g., a base station, an external terminal, and/or a server) via a mobile network such as GSM (Global System for Mobile communications), CDMA (Code Division Multiple Access), or WCDMA (Wideband CDMA). Such wireless signals may carry audio, video, and data according to text/multimedia messages.

The wireless Internet module 113 supports Internet access for the mobile terminal 100. This module may be internally or externally coupled to the mobile terminal 100. The wireless Internet technology can include WLAN (Wireless LAN), Wi-Fi, Wibro™ (Wireless broadband), Wimax™ (World Interoperability for Microwave Access), HSDPA (High Speed Downlink Packet Access), GSM, CDMA, WCDMA, or LTE (Long Term Evolution).

Wireless Internet access by Wibro™, HSPDA, GSM, CDMA, WCDMA, or LTE is achieved via a mobile communication network. In this regard, the wireless Internet module 113 may be considered as being a kind of the mobile communication module 112 to perform the wireless Internet access via the mobile communication network.

The short-range communication module 114 facilitates relatively short-range communications. Suitable technologies for implementing this module include radio frequency identification (RFID), infrared data association (IrDA), ultra-wideband (UWB), as well as the networking technologies commonly referred to as Bluetooth™ and ZigBee™, to name a few.

The position-location module 115 identifies or otherwise obtains the location of the mobile terminal 100. According to one embodiment, this module may be implemented with a global positioning system (GPS) module. The GPS module 115 can precisely calculate current 3-dimensional position information based on at least longitude, latitude or altitude and direction (or orientation) by calculating distance information and precise time information from at least three satellites and then applying triangulation to the calculated information. Location information and time information are calculated using three satellites, and errors of the calculated location position and time information are then amended (or corrected) using another satellite. In addition, the GPS module 115 can calculate speed information by continuously calculating a real-time current location.

With continued reference to FIG. 1, the audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. Furthermore, the processed image frames can be displayed on the display 151.

The image frames processed by the camera 121 can be stored in the memory 160 or can be transmitted to an external recipient via the wireless communication unit 110. Optionally, at least two cameras 121 can be provided in the mobile terminal 100 according to the environment of usage.

The microphone 122 receives an external audio signal while the portable device is in a particular mode, such as phone call mode, recording mode and voice recognition. This audio signal is processed and converted into electronic audio data. The processed audio data is transformed into a format transmittable to a mobile communication base station via the mobile communication module 112 in a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, and a jog switch. FIG. 1 also illustrates the user input unit 130 can include a button 136 (hard or soft button) and a touch sensor 137.

The sensing unit 140 provides sensing signals for controlling operations of the mobile terminal 100 using status measurements of various aspects of the mobile terminal. For instance, the sensing unit 140 may detect an open/closed status of the mobile terminal 100, the relative positioning of components (e.g., a display and keypad) of the mobile terminal 100, a change of position (or location) of the mobile terminal 100 or a component of the mobile terminal 100, a presence or absence of user contact with the mobile terminal 100, and an orientation or acceleration/deceleration of the mobile terminal 100.

As an example, a mobile terminal 100 configured as a slide-type mobile terminal is considered. In this configuration, the sensing unit 140 may sense whether a sliding portion of the mobile terminal is open or closed. According to other examples, the sensing unit 140 senses the presence or absence of power provided by the power supply unit 190, and the presence or absence of a coupling or other connection between the interface unit 170 and an external device. According to one embodiment, the sensing unit 140 can include a proximity sensor 141.

The output unit 150 generates output relevant to the senses of sight, hearing, and touch. Furthermore, the output unit 150 includes the display 151, an audio output module 152, an alarm unit 153, a haptic module 154, and a projector module 155.

The display 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display module 151 may be implemented using known display technologies. These technologies include, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the displays can be implemented in a transparent or optical transmittive type, i.e., a transparent display. A representative example of the transparent display is the TOLED (transparent OLED). A rear configuration of the display 151 can be implemented as the optical transmittive type as well. In this configuration, a user may be able to see an object located at the rear of a terminal body on a portion of the display 151 of the terminal body.

At least two displays 151 can be provided in the mobile terminal 100 in accordance with one embodiment of the mobile terminal 100. For instance, a plurality of displays can be arranged to be spaced apart from each other or to form a single body on a single face of the mobile terminal 100. Alternatively, a plurality of displays can be arranged on different faces of the mobile terminal 100.

If the display 151 and a sensor for detecting a touch action (hereinafter called 'touch sensor') are configured as a mutual layer structure (hereinafter called 'touchscreen'), the display 151 is usable as an input device as well as an output device. In this instance, the touch sensor can be configured as a touch film, a touch sheet, or a touchpad.

The touch sensor can be configured to convert pressure applied to a specific portion of the display 151 or a variation of capacitance generated from a specific portion of the display 151 to an electronic input signal. Moreover, the touch sensor is configurable to detect pressure of a touch as well as a touched position or size.

If a touch input is made to the touch sensor, a signal(s) corresponding to the touch input is transferred to a touch controller. The touch controller processes the signal(s) and then transfers the processed signal(s) to the controller 180. Therefore, the controller 180 is made aware when a prescribed portion of the display 151 is touched.

Referring to FIG. 1, a proximity sensor 141 can be provided at an internal area of the mobile terminal 100 enclosed by the touchscreen or around the touchscreen. The proximity sensor is a sensor that detects a presence or non-presence of an object approaching a prescribed detecting surface or an object existing (or located) around the proximity sensor using an electromagnetic field strength or infrared ray without mechanical contact. Hence, the proximity sensor 141 is more durable than a contact type sensor and also has utility broader than the contact type sensor.

The proximity sensor 141 can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, and an infrared proximity sensor. If the touchscreen includes the electrostatic capacity proximity sensor, it is configured to detect the proximity of a pointer using a variation of an electric field according to the proximity of the pointer. In this configuration, the touchscreen (touch sensor) can be considered as the proximity sensor.

For clarity and convenience of explanation, an action for enabling the pointer approaching the touchscreen to be recognized as placed on the touchscreen may be named 'proximity touch' and an action of enabling the pointer to actually come into contact with the touchscreen may be named 'contact touch'. In addition, a position, at which the proximity touch is made to the touchscreen using the pointer, may mean a position of the pointer vertically corresponding to the touchscreen when the pointer makes the proximity touch.

The proximity sensor detects a proximity touch and a proximity touch pattern (e.g., a proximity touch distance, a proximity touch duration, a proximity touch position, a proximity touch shift state). Information corresponding to the detected proximity touch action and the detected proximity touch pattern can be output to the touchscreen.

The audio output module 152 functions in various modes including a call-receiving mode, a call-placing mode, a recording mode, a voice recognition mode, and a broadcast reception mode to output audio data which is received from the wireless communication unit 110 or is stored in the memory 160. During operation, the audio output module 152 outputs audio relating to a particular function (e.g., call received, message received). The audio output module 152 may be implemented using one or more speakers, buzzers, other audio producing devices, and combinations of these devices.

The alarm unit 153 outputs a signal for announcing the occurrence of a particular event associated with the mobile terminal 100. Typical events include a call received, a message received and a touch input received. The alarm unit 153 can output a signal for announcing the event occurrence by way of vibration as well as video or audio signal. The video or audio signal can be output via the display 151 or the audio output module 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. The strength and pattern of the vibration generated by the haptic module 154 are controllable. For instance, different vibrations can be output in a manner of being synthesized together or can be output in sequence.

The haptic module 154 can generate various tactile effects as well as the vibration. For instance, the haptic module 154 may generate an effect attributed to the arrangement of pins vertically moving against a contact skin surface, an effect attributed to the injection/suction power of air though an injection/suction hole, an effect attributed to the skim over a skin surface, an effect attributed to a contact with an electrode, an effect attributed to an electrostatic force, and an effect attributed to the representation of a hot/cold sense using an endothermic or exothermic device.

The haptic module 154 can be implemented to enable a user to sense the tactile effect through a muscle sense of a finger or an arm as well as to transfer the tactile effect through direct contact. Optionally, at least two haptic modules 154 can be provided in the mobile terminal 100 in accordance with an embodiment of the mobile terminal 100.

The memory 160 is generally used to store various types of data to support the processing, control, and storage requirements of the mobile terminal 100. Examples of such data include program instructions for applications operating on the mobile terminal 100, contact data, phonebook data, messages, audio, still pictures (or photo), and moving pictures. Furthermore, a recent use history or a cumulative use frequency of each data (e.g., use frequency for each phonebook, each message or each multimedia file) can be stored in the memory 160.

Moreover, data for various patterns of vibration and/or sound output in response to a touch input to the touchscreen can be stored in the memory 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory or XD memory), or other similar memory or data storage device. Furthermore, the mobile terminal 100 can operate in association with a web storage for performing a storage function of the memory 160 on the Internet.

The interface unit 170 may be implemented to couple the mobile terminal 100 with external devices. The interface unit 170 receives data from the external devices or is supplied with power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, and/or an earphone port.

The identity module is a chip for storing various kinds of information for authenticating a usage authority of the mobile terminal 100 and can include a User Identify Module (UIM), a Subscriber Identity Module (SIM), and/or a Universal Subscriber Identity Module (USIM). A device having the identity module (hereinafter called 'identity device') can be manufactured as a smart card. Therefore, the identity device is connectible to the mobile terminal 100 via the corresponding port.

When the mobile terminal 100 is connected to an external cradle, the interface unit 170 becomes a passage for supplying the mobile terminal 100 with a power from the cradle or a passage for delivering various command signals input from the cradle by a user to the mobile terminal 100. Each of the various command signals input from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, and video calls. The controller 180 may include a multimedia module 181 that provides multimedia playback. The multimedia module 181 may be configured as part of the controller 180, or implemented as a separate component.

Moreover, the controller 180 can perform a pattern (or image) recognizing process for recognizing a writing input and a picture drawing input carried out on the touchscreen as characters or images, respectively.

The power supply unit 190 provides power required by various components of the mobile terminal 100. The power may be internal power, external power, or combinations of internal and external power.

Various embodiments described herein may be implemented in a computer-readable medium using, for example, computer software, hardware, or some combination of computer software and hardware. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which performs one or more of the functions and operations described herein. The software codes can be implemented with a software application written in any suitable programming language and may be stored in memory such as the memory 160, and executed by a controller or processor, such as the controller 180.

Figure 2:
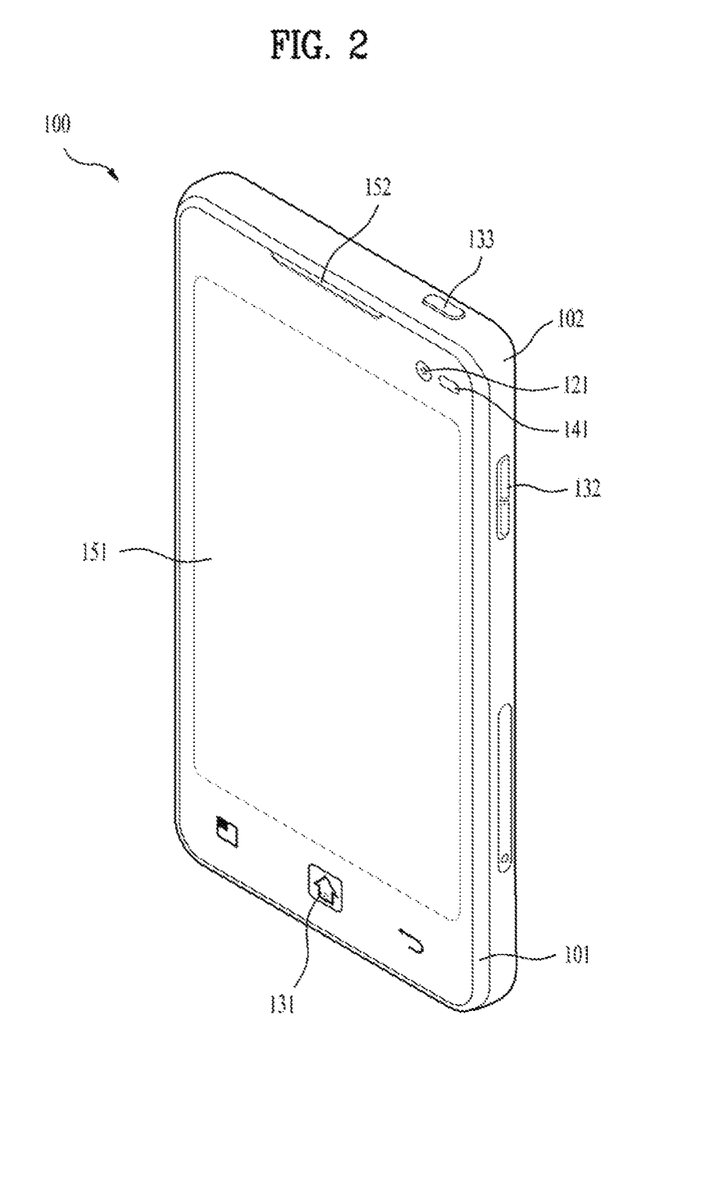
FIG. 2 is a front perspective diagram of a mobile terminal according to one embodiment of the present invention.

FIG. 2 is a front perspective view of a mobile terminal according to one embodiment of the present invention. The mobile terminal 100 illustrated in FIG. 2 has a bar type terminal body. However, the mobile terminal 100 may be implemented in a variety of different configurations. Examples of such configurations include folder-type, slide-type, rotational-type, swing-type and combinations thereof. For ease of description, the following disclosure will primarily relate to a bar-type mobile terminal 100. However, the present invention applies equally to other types of mobile terminals.

Referring to FIG. 2, the mobile terminal 100 includes a case (a casing, housing, or cover) constituting an exterior of the mobile terminal. In the present embodiment, the case can be divided into a front case 101 and a rear case 102. Various electric/electronic parts are loaded in a space (volume) provided between the front and rear cases 101 and 102. Optionally, at least one middle case can be further provided between the front and rear cases 101 and 102 in addition.

The cases 101 and 102 are formed by injection molding of synthetic resin or can be formed of metal substance such as stainless steel (STS), titanium (Ti) or the like for example.

A display 151, an audio output module 152, a camera 121, manipulating units 131 and 132, a microphone 122, and an interface unit 170 can be provided at the terminal body, and more particularly, at the front case 101. Manipulating units 131 and 132 are part of the user input unit 130.

The display 151 occupies most of a main face of the front case 101. The audio output module 152 and the camera 121 are provided at an area adjacent to an end portion of the display 151, while the manipulating unit 131 and the microphone 122 are provided at an area adjacent to the other end portion of the display 151. The manipulating unit 132 and the interface unit 170 can be provided at lateral sides of the front and rear cases 101 and 102. Another manipulating unit 133 can be provided on a top portion of the case 102.

The user input unit 130 is manipulated (operated) to receive a command for controlling an operation of the terminal 100. Furthermore, the user input unit 130 may include a plurality of manipulating units 131 and 132. The manipulating units 131 and 132 can be referred to as a manipulating portion and may adopt any tactile mechanism that enables a user to perform a manipulation action by touch.

Content input by manipulating units 131 and 132 can be divided between the two. For instance, a command such as start, end, and scroll is input to first manipulating unit 131. Furthermore, a command for a volume adjustment of sound output from the audio output module 152, or a command for a switching to a touch recognizing mode of the display 151 can be input to second manipulating unit 132.

Meanwhile, such a graphic for pointing at a specific object on a display unit or selecting a menu from the display unit as an arrow, a finger and the like is called a pointer or a cursor. However, the pointer is frequently used to mean a finger, a stylus pen or the like for a touch manipulation and the like. In order to clearly discriminate the pointer and the cursor from each other in this disclosure, a graphic displayed on a display unit is named a cursor and such a physical means for performing a touch, a proximity touch, a gesture and the like as a finger, a stylus pen and the like is named a pointer.

Selective Transmission of Composed Message with Reference to Timing Point of Reception of Counterpart Message.

In the following description, various embodiments of a controlling method implemented in the above-configured mobile terminal are described.

For clarity and convenience of the following description, assume that a mobile terminal mentioned in the following description includes at least one of the components shown in FIG. 1. In particular, a mobile terminal according to the present embodiment includes the wireless communication unit 112, the display unit 151 and the controller 180 at least among the components shown in FIG. 1. If the display module 151 includes a touchscreen, implementation of the following embodiments may be further facilitated. Therefore, the following description is made on the assumption that the display module 151 includes a touchscreen in the specification and drawings.

And, messages mentioned in the following description may include text messages (e.g., messages by SMS (short message service), messages by LMS (long message service), etc.), multimedia messages (e.g., messages by MMS (multimedia message service), etc.). Moreover, embodiments of the present invention described in the following are applicable to the received data (e.g., a messenger application, an instant messenger application, an email, etc.) of any type, which require user confirmation, as well as to messages.

According to one embodiment of the present invention, a mobile terminal transceiver a message with a counterpart through a wireless communication unit and a message transceived with a specific counterpart is displayed on a touchscreen. Preferably, the transceived message can be displayed through a chat window configured with the specific counterpart. In the chat window, messages transceived with the specific counterpart can be included only. In particular, a prescribed visual effect can be given to each of the messages displayed on the chat window in a manner that a message sent by a user of the mobile terminal is visually identifiable from a message received from the specific counterpart.

In doing so, the user can access the chat window by selecting one message item from a counterpart based message list. In this case, the counterpart based message list can include at least one message item corresponding to each of at least one or more counterparts. In case that a plurality of messages are received from the specific counterpart, a plurality of the messages configure a single chat window and a single message item corresponding to the chat window is created. If one message item is selected from the counterpart based message list, the chat window screen can be accessed.

There may exist a single specific counterpart or a plurality of specific counterparts. In case that a plurality of specific counterparts exist, they can be configured as a single group. A single chat window can be configured for the single group. In this case, all messages sent by members of the group are included in the chat window. And, the message sent by each of the members can be open to the rest of the members.

According to one embodiment of the present invention, while a message is inputted to the above-described chat window, if a message is received from a counterpart, a method of selectively transmitting a message inputted before a message reception timing point or a message inputted after the message reception timing point with reference to the message reception timing point is proposed.

Figure 3:
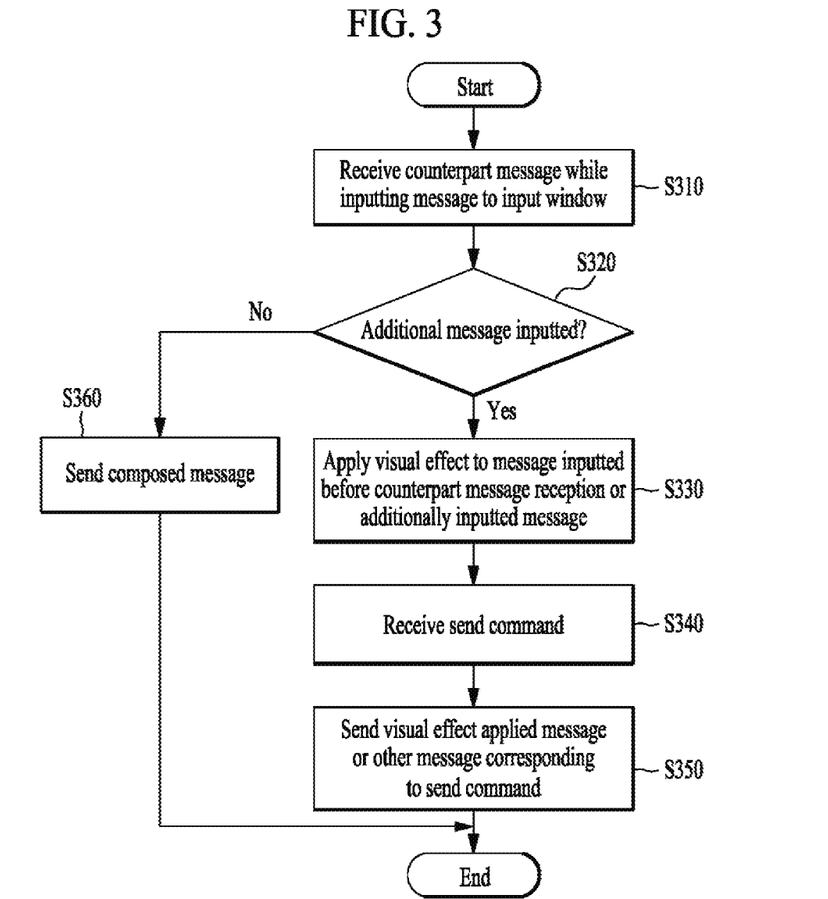
FIG. 3 is a flowchart of a process for controlling a mobile terminal according to one embodiment of the present invention.

FIG. 3 is a flowchart of a process for controlling a mobile terminal according to one embodiment of the present invention.

Referring to FIG. 3, in the course of inputting one message to a message input window of a chat window, another message can be received from a counterpart [S310]. In this case, 'in the course of inputting one message' may indicate that the message input window provided to the chat window is not empty and may mean a state that a 'send' command is not inputted. And, 'the message input window provided to the chat window is not empty' may mean that at least one of at least one portion of a text (e.g., numerals, texts, symbols, etc.) transmittable to the counterpart, an attachment file, and various emoticons/images/sound paging commands self-provided by an application for sending and displaying messages is inputted to the message input window. Of course, this description is just exemplary. And, no limitations are put on any types of contents that can be transmitted as a message to a counterpart by being inputted to the message input window. Meanwhile, the received message can be displayed at a position corresponding to an arrival time in the chat window.

As the message is received from the counterpart, a user can modify a currently composed message or may compose a message in addition. Moreover, the message composition has been already completed before the reception of the counterpart message. In this case, the user can directly send the corresponding message with the additional message input of the step S320 [S360].

On the other hand, if the message composition is not completed yet, the user can complete the currently composed message or can additionally input a message of a different content in order to make a reply to the message received from the counterpart irrespective of the currently composed message [S320].

In doing so, a prescribed visual effect can be given to the message inputted before the counterpart message reception or the additionally inputted [S330]. In this case, the visual effect may include at least one of an outline effect, an indicator display mentioned in the following description, effects of light and shade, a message color change, and the like for example. If a message inputted before a counterpart message reception timing is identifiable from a message inputted after the counterpart message reception timing, the visual effect of the present invention is non-limited by any visual effects.

Subsequently, if a send command is received [S340], a message corresponding to the send command among the visual effect applied message and the visual effect non-applied messages can be sent to the counterpart [S350].

Thereafter, the message failing to correspond to the send command may remain and keep being displayed, whereas the part corresponding to the sent message disappears from the message input window [not shown in the drawing].

A visual effect for discriminating a message inputted before a counterpart message reception from a message inputted after the counterpart message reception and a send command for selectively determining a message to send shall be described in detail later.

Message sending methods according to one embodiment of the present invention are described with reference to FIGS. 4 to 9 as follows.

Figure 4:
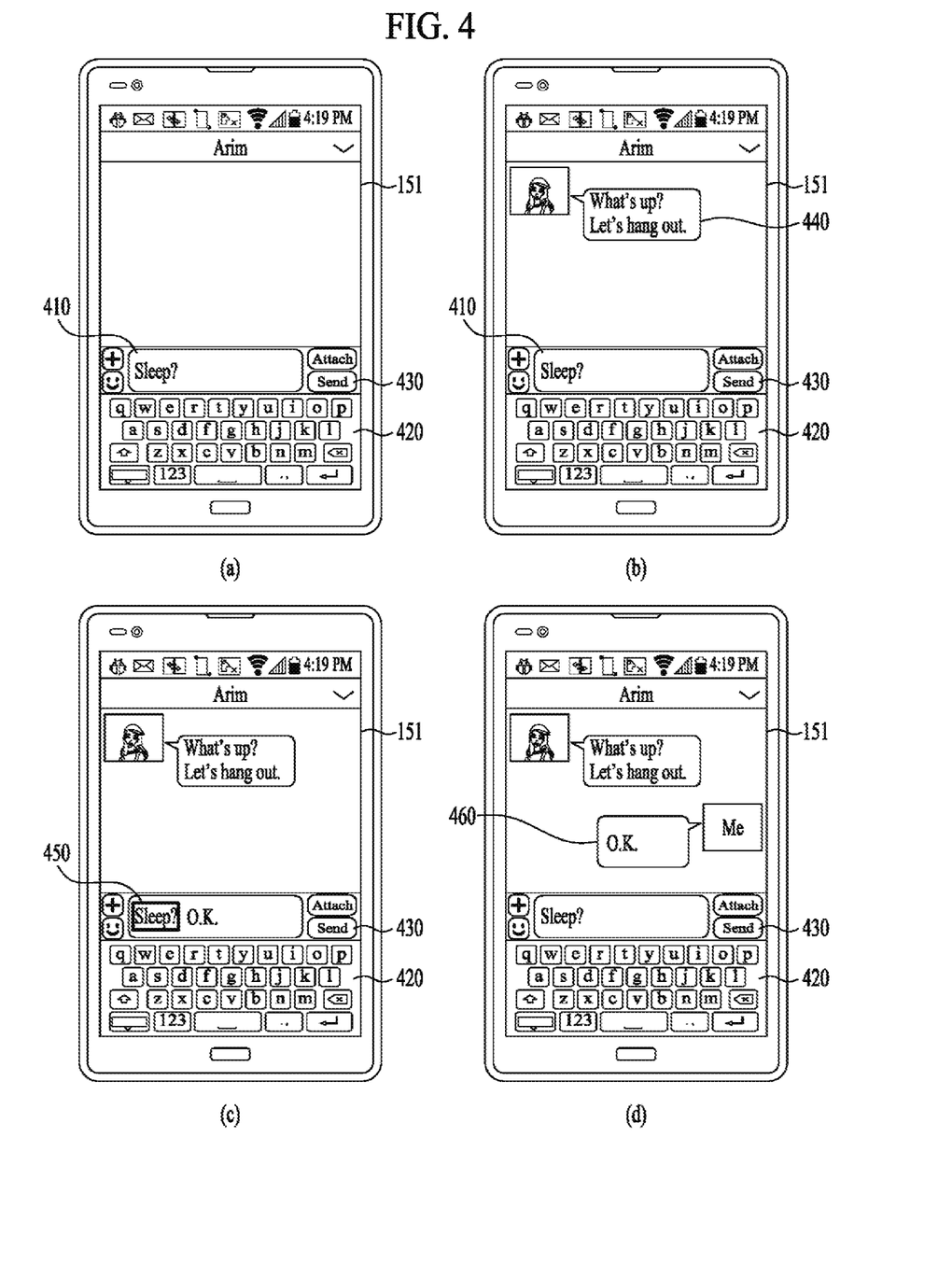
FIG. 4 is a diagram for one example of a method of selectively sending a message from a mobile terminal according to one embodiment of the present invention.

FIG. 4 is a diagram for one example of a method of selectively sending a message from a mobile terminal according to one embodiment of the present invention.

Referring to FIG. 4 (a), as an application capable of message exchange is activated, a chat window capable of message exchange with a specific counterpart is displayed on a touchscreen of a mobile terminal. In doing so, a user composes a message 'sleep?' on a message input window 410 using a virtual keypad 420 and is then able to send the composed message to a counterpart by selecting a send button 430. Yet, referring to FIG. 4 (b), as a message 'What's up? Let's hang out.' 440 is received from the counterpart before sending the composed message, if the received message 440 is displayed on a chat display region on a top end of the message input window 410, the composed message may be inappropriate for a reply to the message 440 received from the counterpart. In this case, the user may delete the composed message using a backspace key of the virtual keypad 420 or the like. Alternatively, the user may additionally input a message to the chat window after the reception of the counterpart message 440. In this case, referring to FIG. 4 (c), a prescribed visual effect 450 may be displayed on the message 'sleep?' inputted before the reception of the counterpart message 440. After completing the additional message input, if the user selects the send button 430, referring to FIG. 4 (d), only the message 460, to which the visual effect is not given, is sent to the counterpart and can be displayed on the chat window. Subsequently, the visual effect disappears and the message inputted before the reception of the counterpart message 440 can be left on the chat window. In doing so, if the send button 430 is selected again, the message left on the message input window 410 can be sent to the counterpart.

According to the description with reference to FIG. 4, a visual effect is given to a message composed before a reception or arrival of a counterpart message for example. A visual effect can be given to a message additionally inputted after the reception/arrival of the counterpart message. And, different visual effects may be given to the previously composed message and the additionally inputted message, respectively.

By the above-described method, a user can selectively send an additionally inputted message only without deleting a previously composed message separately.

A selective message transmission can be performed through a touch input as well as a selection of a send button. This is described in detail with reference to FIG. 5 as follows.

Figure 5:
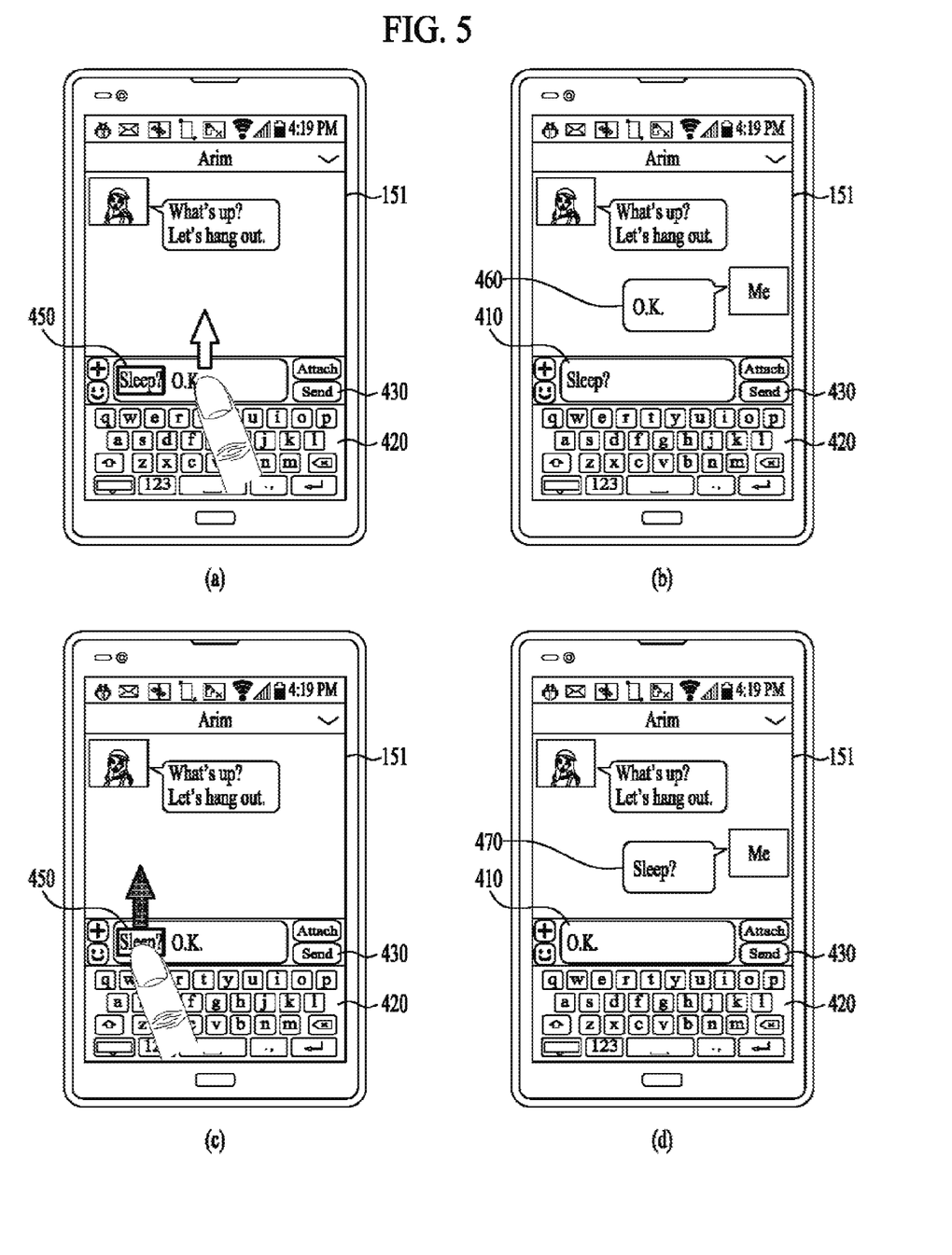
FIG. 5 is a diagram for one another of a method of selectively sending a message from a mobile terminal according to one embodiment of the present invention.

FIG. 5 is a diagram for one another of a method of selectively sending a message from a mobile terminal according to one embodiment of the present invention.

Referring to FIG. 5, if a user drags a region, on which a message inputted after a reception of a counterpart message is displayed in the message input window 410 shown in FIG. 4 (c), to a chat display region [FIG. 5 (a)], the dragged conversation 460 can be displayed on the chat display region.

On the other hand, if a region, on which a message having a visual effect 450 given thereto, is dragged to the chat display region [FIG. 5 (c)], the dragged conversation 470 can be displayed on the chat display region only [FIG. 5 (d)].

Meanwhile, if a specific message in a message displayed on the message input window 410 is dragged down in a virtual keypad direction instead of being dragged up like FIG. 5, the corresponding message can disappear from the message input window 410. Similarly, if a specific message in a message displayed on the message input window 410 is dragged in a right or left direction, a clipboard copy or cut function can be performed depending on the drag direction.

A method of cancelling a visual effect is described in detail with reference to FIG. 6 as follows.

Figure 6:
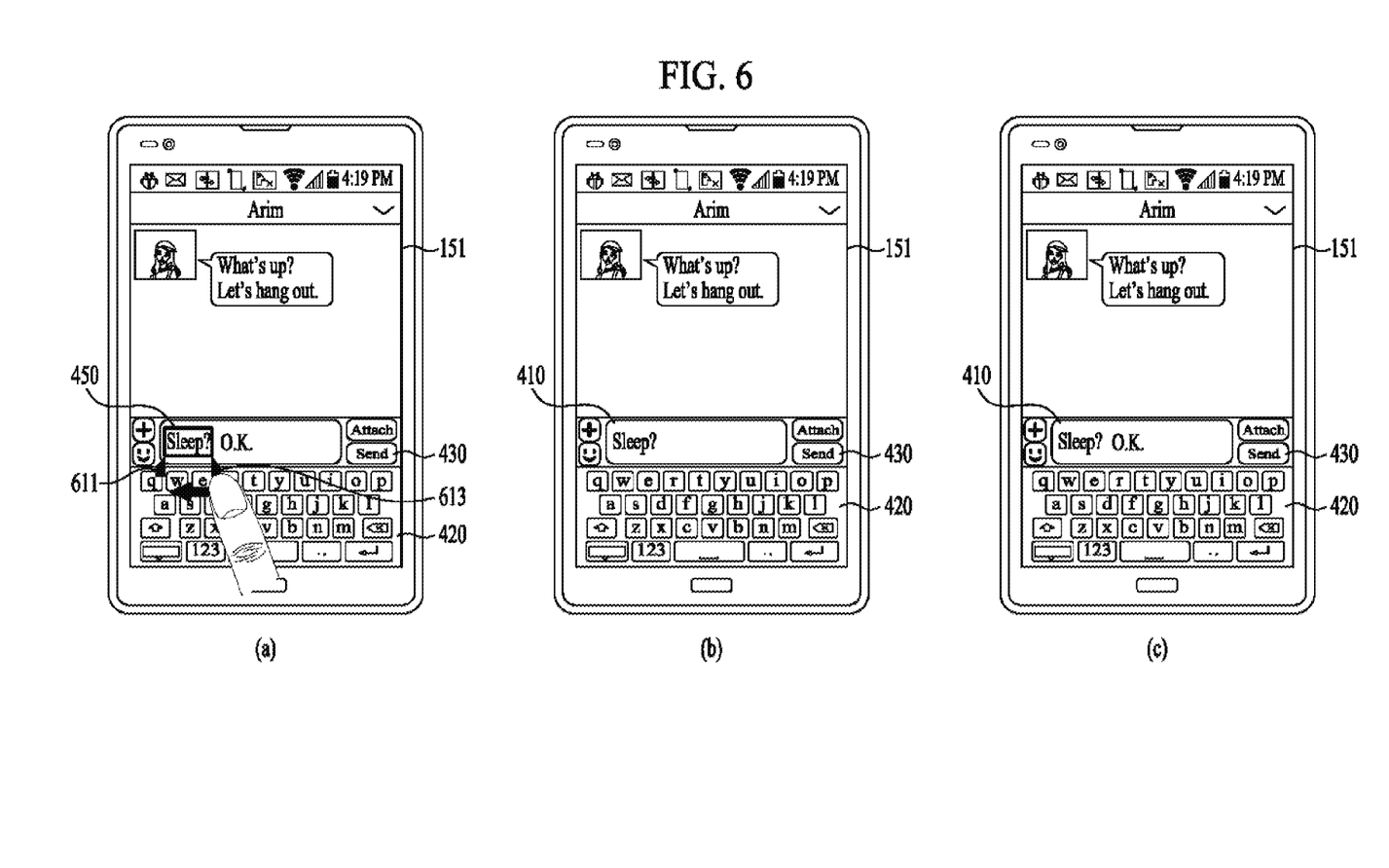
FIG. 6 is a diagram for one example of a method of cancelling a visual effect given to a message in a mobile terminal according to one embodiment of the present invention.

FIG. 6 is a diagram for one example of a method of cancelling a visual effect given to a message in a mobile terminal according to one embodiment of the present invention.

Referring to FIG. 6 (a), if a user touches an edge region of the above-described visual effect 450 or a message is additionally inputted after an arrival (or reception) of a counterpart message in accordance with settings, indicators 611 and 613 for adjusting a size of the visual effect 450 can be automatically displayed on both lateral sides of the visual effect 450, respectively. In doing so, as the user drags one of the indicators to the other gradually, the visual effect 450 can be reduced. Hence, when a send button 430 is selected, a range of a message sent to a counterpart in a message input window 410 can be changed. If the user drags one of the indicators until the dragged indicator meets the other, a message additionally composed after the reception of the counterpart message can disappear from the message input window 410 [FIG. 6 (b)], or the visual effect may disappear only [FIG. 6 (c)].

Meanwhile, as mentioned in the foregoing description, a separate message input window can be additionally created instead of giving a visual effect to a message in an existing message input window. This is described in detail with reference to FIG. 7 as follows.

Figure 7:
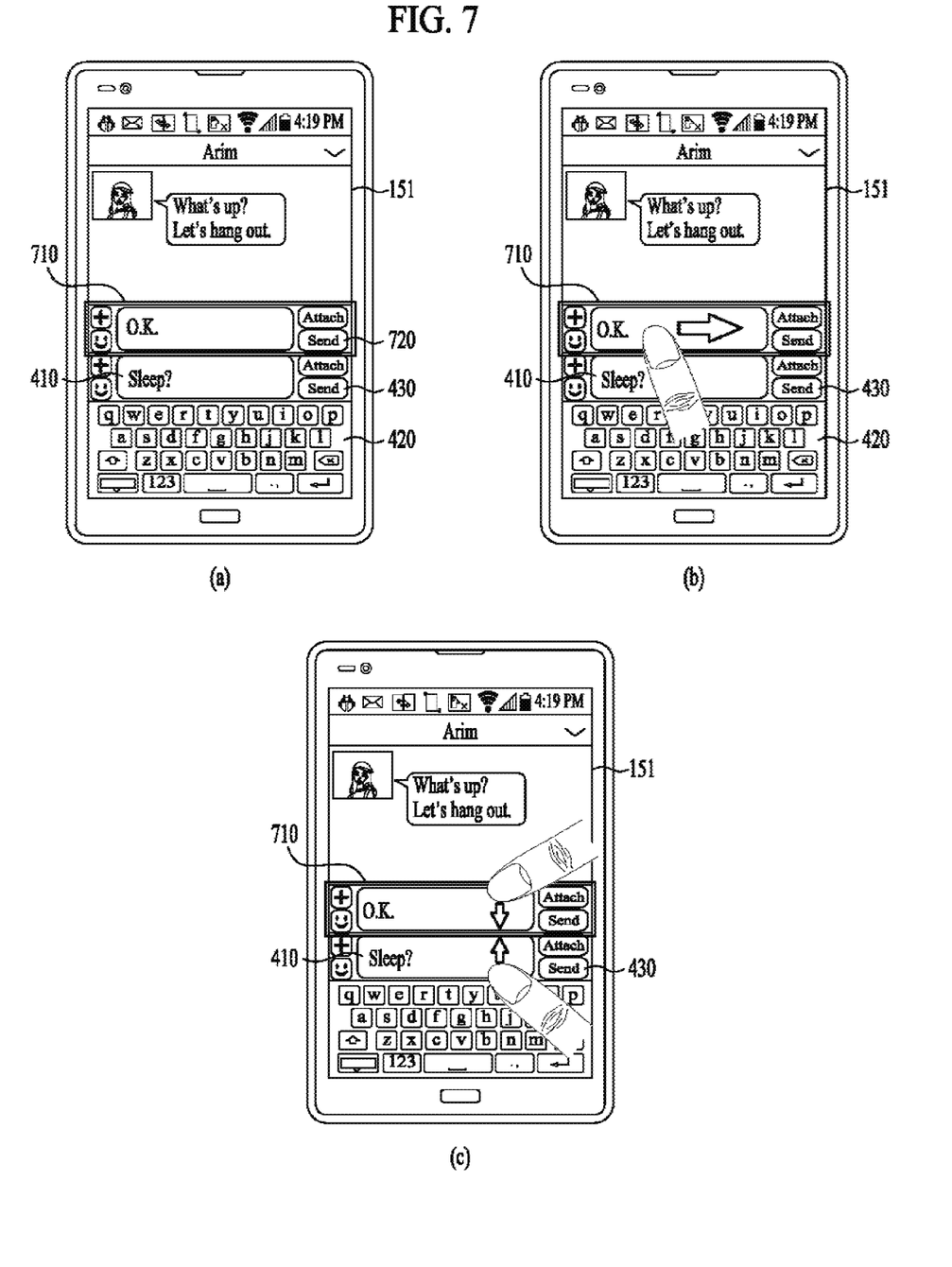
FIG. 7 is a diagram for one example of a process for displaying a message inputted after a reception of a counterpart message on a separate message input window in a mobile terminal according to one embodiment of the present invention.

FIG. 7 is a diagram for one example of a process for displaying a message inputted after a reception of a counterpart message on a separate message input window in a mobile terminal according to one embodiment of the present invention.

In FIG. 7 (a), assume a case that a message 'O.K.' is inputted after a reception of the counterpart message 440 in the former situation shown in FIG. 4 (b). Referring to FIG. 7 (a), as a message is additionally inputted after a reception of a counterpart message, an additional message input window 710 is created nearby an existing message input window 410. And, a message inputted before the reception of the counterpart message can be displayed on the existing message input window 410. In this case, the messages displayed on the message input windows 410 and 710 can be independently edited and can be also sent through send buttons 430 and 720 provided to the corresponding input windows, respectively. In doing so, if the message displayed on one of the message input windows is sent, the corresponding input window disappears and the remaining input window can be displayed only. Moreover, referring to FIG. 7 (b), if the message displayed on the message input window 710 is dragged in a direction other than a top direction for example, the corresponding message input window 710 can disappear. Of course, if the message is dragged in the top direction, it can cause the same effect as selecting the send button 720. Besides, referring to FIG. 7 (c), while the two message input windows are touched with different pointers, respectively, if the touch points are dragged to get closer to each other, the two message input windows merge into one to be displayed in the same configuration as shown in FIG. 4 (c).

The above-described visual effects are applicable to attachment files. This is described with reference to FIG. 8 as follows.

Figure 8:
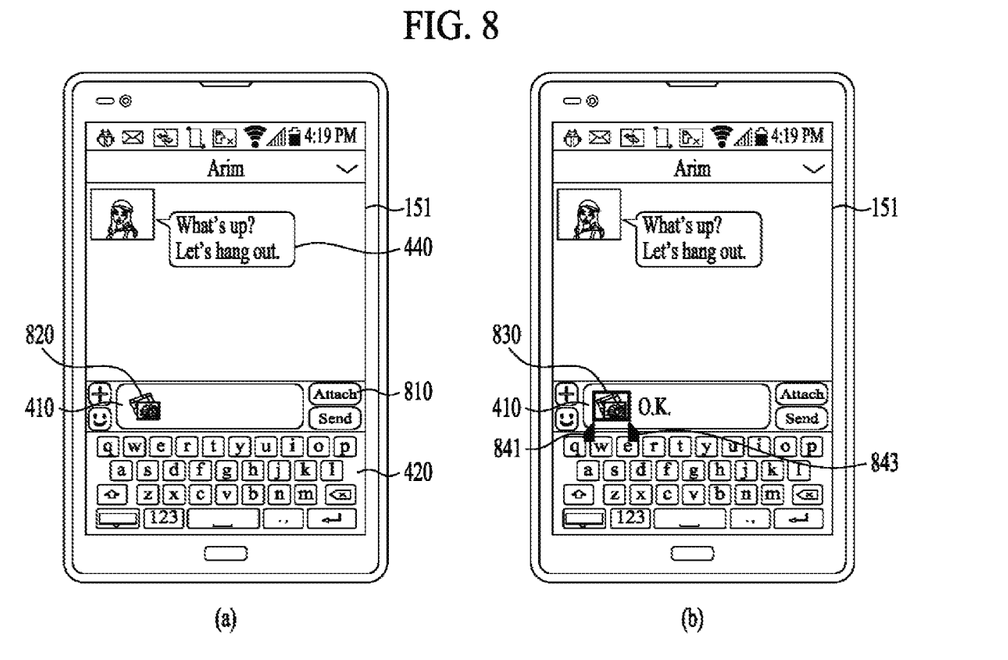
FIG. 8 is a diagram for one example of a process for displaying a visual effect on an attachment file in a mobile terminal according to one embodiment of the present invention.

FIG. 8 is a diagram for one example of a process for displaying a visual effect on an attachment file in a mobile terminal according to one embodiment of the present invention.

Referring to FIG. 8 (a), as an application capable of message exchange is activated, a chat window capable of message exchange with a specific counterpart is displayed on a touchscreen of a mobile terminal. In doing so, a user can select a file to send to a counterpart through an attach button 810. Hence, an icon 820 corresponding to the selected file can be displayed on a message input window 410. Yet, as a message 'What's up? Let's hang out.' 440 is received from the counterpart before sending the selected file, if the received message 440 is displayed on a chat display region on a top end of the message input window 410, the selected file may be inappropriate for a reply to the message 440 received from the counterpart. In this case, the user may delete the selected file using a backspace key of a virtual keypad or the like. Alternatively, the user may additionally input a message to the chat window after the reception of the counterpart message 440. In this case, referring to FIG. 4 (b), prescribed visual effects 830, 841 and 843 may be displayed on the icon 820 currently displayed on the message input window 410 before the reception of the counterpart message 440. In this case, since a selective transmission method or a method of using the indicators 841 and 843 are similar to those mentioned in the foregoing description, the redundant descriptions shall be omitted from the following description for clarity of the present specification.

Meanwhile, according to one embodiment of the present invention, when a plurality of messages are displayed on a chat display region, a method of determining a position of a message to send is provided. This is described in detail with reference to FIG. 9 as follows.

Figure 9:
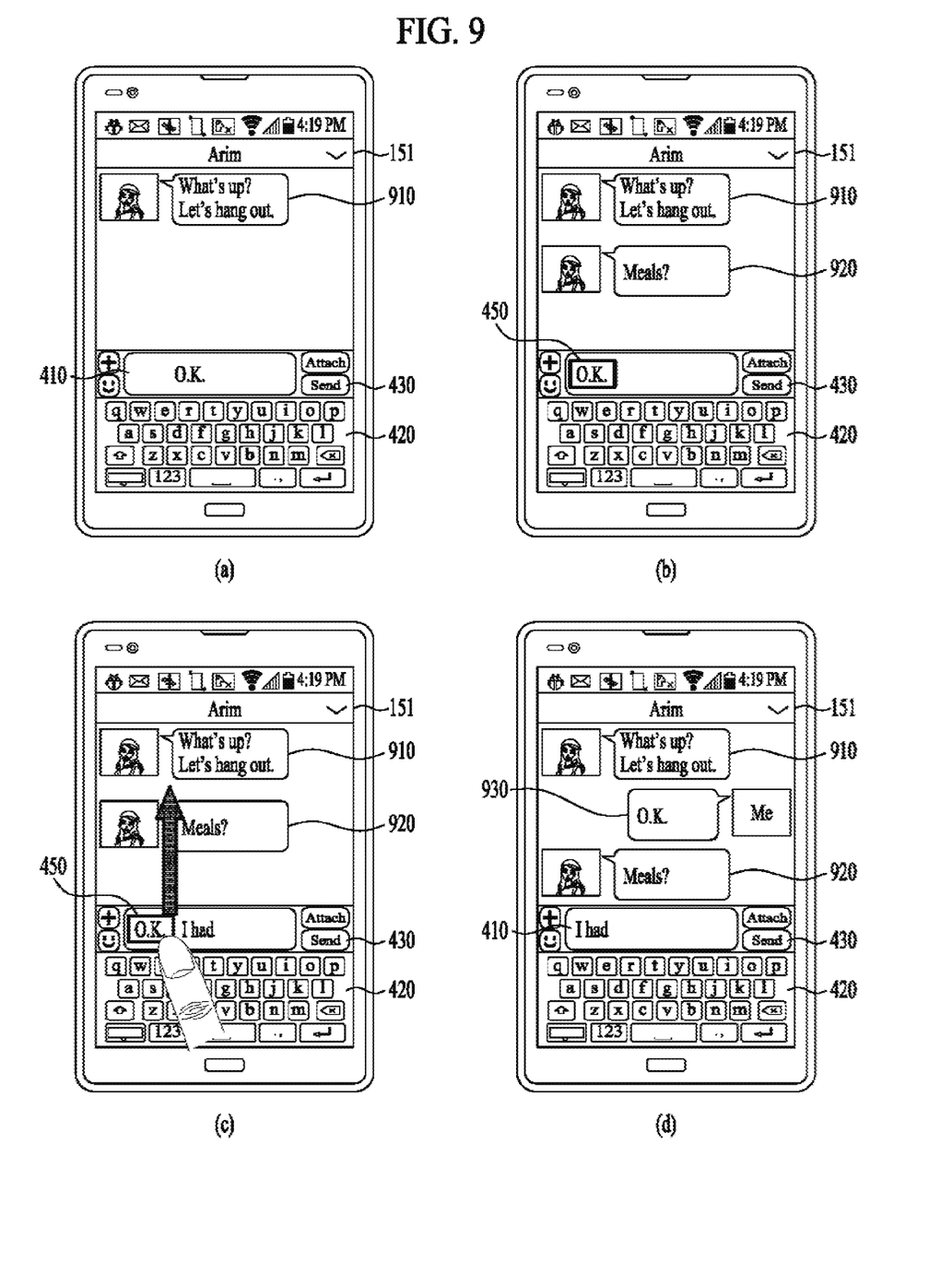
FIG. 9 is a diagram for one example of a method of selecting a message position according to one embodiment of the present invention.

FIG. 9 is a diagram for one example of a method of selecting a message position according to one embodiment of the present invention.

Referring to FIG. 9 (a), as an application capable of message exchange is activated, a chat window capable of message exchange with a specific counterpart is displayed on a touchscreen of a mobile terminal. In doing so, while a user is composing a reply to a message 910 received from a counterpart in a message input window 410, referring to FIG. 9 (b), a different message 920 may arrive from the counterpart. In this case, if the user inputs a reply to the different message 920 to the chat window in addition to the previously composed message, a visual effect 450 can be given to the previously composed message. Subsequently, if the user directly selects a send button, as mentioned in the foregoing description, the additionally composed message can be displayed below the $2^{nd}$ message 920 of the counterpart in the chat display region [not shown in the drawing]. Yet, if the user drags the message having the visual effect 450 applied thereto, i.e., the message composed before the arrival of the $2^{nd}$ message 920 of the counterpart, to a space between the $1^{st}$ message 910 and the $2^{nd}$ message 920 of the counterpart [FIG. 9 (c)], the dragged message can be displayed at a touch-released point [FIG. 9 (d)]. Thus, the message sent by having a specified display position can be displayed at a specific position (i.e., between a $1^{st}$ message and a $2^{nd}$ message) in a counterpart terminal. To this end, when the corresponding message 930 is sent, the controller 180 can transmit an information for specifying a display order of the message to the counterpart terminal as well. If a plurality of counterparts are present in the corresponding chat window, it is a matter of course that the information for specifying the display order of the corresponding message can be transmitted to a plurality of the counterparts.

It will be apparent to those skilled in the art that various modifications and variations can be specified into other form(s) without departing from the spirit or scope of the inventions.

According to one embodiment of the present invention, the above-described methods can be implemented in a program recorded medium as processor-readable codes. The processor-readable media include all kinds of recording devices in which data readable by a processor are saved. The processor-readable media include ROM, RAM, CD-ROM, magnetic tapes, floppy discs, optical data storage devices, and the like for example and also include carrier-wave type implementations (e.g., transmission via Internet).

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:
1. A mobile terminal comprising:
   a touchscreen;
   a wireless communication unit configured to communicate with an external device;
   a controller configured to:
   cause the touchscreen to display a first input message of a messaging application in a first message input window;
   receive an incoming message of the messaging application from the external device, via the wireless commu- nication unit, while the first input message is displayed in the first message input window and cause the touchscreen to display the received incoming message;

cause the touchscreen to display a second input message of the messaging application inputted after receiving the incoming message in a second message input window, wherein the second message input window is generated as the second input message is inputted after receiving the message; and cause the wireless communication unit to transmit only the first input message or the second input message to the external device in response to an input for selectively transmitting one of the first input message displayed in the first message input window or the second input message displayed in the second message input window, wherein the input is received while the first input message is displayed in the first message input window and the second input message is displayed in the second message input window.

2. The mobile terminal of claim 1, wherein the controller is further configured to cause the touchscreen to stop display of the first or second message input window when the first input message or the second input message is transmitted in response to the input.

3. The mobile terminal of claim 1, wherein the controller is further configured to cause the touchscreen to stop display of the first or second message input window in response to a touch drag input to the first or second message input window in a specific direction.

4. The mobile terminal of claim 1, wherein the controller is further configured to cause the touchscreen to merge the first message input window and the second message input window in response to respective touch drag inputs to the first message input window and the second message input window toward each other.

5. The mobile terminal of claim 1, wherein the first input message in the first message input window is editable independently from the second input message in the second message input window.

6. The mobile terminal of claim 1, wherein the first message input window is displayed together with a first file attachment button and a first send button, and the second message input window is displayed together with a second file attachment button and a second send button.

7. The mobile terminal of claim 6, wherein the first input message comprises an icon of a file selected via the first file attachment button.

8. The mobile terminal of claim 1, wherein the incoming message is displayed in a chat display region that is separate from the first message input window and the second message input window.

9. The mobile terminal of claim 1, wherein the first input message is a text inputted via a virtual keypad.

10. A method of controlling a mobile terminal, the method comprising:

displaying, via a touchscreen of the mobile terminal, a first input message of a messaging application in a first message input window;

receiving, via wireless communication, an incoming message of the messaging application from an external device while the first input message is displayed in the first message input window;

displaying, via the touchscreen, the received incoming message;

displaying, via the touchscreen, a second input message of the messaging application inputted after receiving the incoming message in a second message input window, wherein the second message input window is generated as the second input message is inputted after receiving the incoming message; and transmitting, via wireless communication, only the first input message or the second input message to the external device in response to an input for selectively transmitting one of the first input message displayed in the first message input window or the second input message displayed in the second message input window, wherein the input is received while the first input message is displayed in the first message input window and the second input message is displayed in the second message input window.

11. The method of claim 10, further comprising stopping display of the first or second message input window when the first input message or the second input message is transmitted in response to the input.

12. The method of claim 10, further comprising stopping display of the first or second message input window in response to a touch drag input to the first or second message input window in a specific direction.

13. The method of claim 10, further comprising merging the first message input window and the second message input window in response to respective touch drag inputs to the first message input window and the second message input window toward each other.

14. The method of claim 10, wherein the first input message in the first message input window is editable independently from the second input message in the second message input window.

15. The method of claim 10, wherein the first message input window is displayed together with a first file attachment button and a first send button, and the second message input window is displayed together with a second file attachment button and a second send button.

16. The method of claim 15, wherein the first input message comprises an icon of a file selected via the first file attachment button.

17. The method of claim 10, wherein the received message is displayed in a chat display region that is separate from the first message input window and the second message input window.

18. The method of claim 10, wherein the first input message is a text inputted via a virtual keypad.

* * * * *